Patented Sept. 28, 1926.

1,601,229

UNITED STATES PATENT OFFICE.

HARRY YUDOWITCH, NOW BY CHANGE OF NAME HARRY AMOS NEWTON, OF NEW YORK, N. Y.

EDIBLE FAT.

REISSUED

No Drawing.  Application filed February 16, 1923. Serial No. 619,516.

The object of the present invention is to provide a substitute for chicken fat which has been rendered with onions, cooked till they are brown and crisp. Chicken fat is being used very largely both as an edible fat and for cooking purposes, chiefly by the Jewish people.

The present invention aims to provide an edible fat which will have the flavor of such chicken fat as well as certain other physical characteristics thereof, as hereinafter pointed out, which fat is very inexpensive as compared to ordinary chicken fat, and may be utilized for the same purposes. Moreover, it has the additional advantage of keeping for a much greater length of time than chicken fat without becoming rancid or otherwise becoming deleteriously affected.

In carrying out the invention, a clarified vegetable oil is employed, such as peanut oil, soja bean oil, or cottonseed oil. With this is mixed a suitable hardened vegetable oil, as for example, hydrogenated cottonseed oil, the amount of hardened oil, preferably, being about two percent of the mixture, though a greater or less amount may be employed. A small amount of coloring material, such as carrot yellow may also be introduced to obtain any desired shade. In this mixture may also be introduced a small amount of chicken fat, for example, anywhere from five to fifteen percent of the vegetable oil employed. Inasmuch however, as chicken fat is difficult to obtain and is expensive, dressed chicken is preferably employed in lieu of chicken fat and besides securing the desired result has the additional advantage of being enhanced in value as an edible by reason of its treatment in the oil, approximately one pound of chicken to each four pounds of oil being found satisfactory. The whole is heated to boiling point, and finally there is added raw onions, preferably sliced, about one pound to three pounds of the oil, though the proportions in this respect may be varied.

The mixture is then boiled and the boiling is continued until the onions turn to a light-brown color and become crisp. The whole is then quickly strained while hot, and the resultant liquid is allowed to cool and will become hardened. Before use, it is preferably permitted to stand at least two days, which has the effect of ripening it and creating the distinctive flavor of chicken fat retaining, however, a slight flavor of the onions.

One of the most important phases of this process is the continuing of the boiling until the onions have become brown and crisp, for it has been found that otherwise the desired characteristics of the product are not obtained, and this is probably due to the fact that the fixed oil in the onions is not driven therefrom into the mixture until the onions are brought to a crisp condition. At the same time it has been also found absolutely necessary to avoid burning the onions since it appears to destroy the desirable characteristics. Care therefore must be taken to stir the boiling material and keep the onions from being burned. Ordinarily about forty-five minutes boiling is sufficient to secure the desired results, the time depending on the quantity and the depth of the oil in the receptacle.

The resultant product is in the form of a hardened oil or grease, having the odor, taste, and fibrous consistency of chicken fat, and being a substitute for the same that can be employed wherever the fat is now used for culinary purposes. It can be produced in large quantities, and is very much less expensive than chicken fat, and has good keeping qualities, since there is but a small amount of animal matter, and the ingredients used are not liable to become rancid. If, however, they do deteriorate, they may be restored by taking the product and recooking it with fresh onions in the manner above described.

Having thus fully described my invention, what I claim as new, and desire to secure by Letters Patent, is:—

1. An edible vegetable fat of suitable consistency having substantially the physical characteristics of chicken fat which has been rendered with onions, such as flavor, odor, etc., containing a homogeneous mixture of a vegetable fat and the products resulting from onions which have been cooked to a browned, crisp condition in said fat.

2. The process of making an edible vegetable fat having substantially the physical characteristics of chicken fat such as flavor, odor, etc., which consists in heating a vegetable fat with onions until the onions have become browned and crisp and then removing the onions from the fat.

In testimony whereof, I affix my signature.

HARRY YUDOWITCH.